(12) United States Patent
Yamaguchi (10) Patent No.: US 9,793,547 B2
(45) Date of Patent: Oct. 17, 2017

(54) LITHIUM SECONDARY BATTERY AND METHOD FOR PRODUCING SAME

(71) Applicant: TOYOTA JIDOSHA KABUSHIKI KAISHA, Toyota-shi, Aichi (JP)

(72) Inventor: Hiroyuki Yamaguchi, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 207 days.

(21) Appl. No.: 14/409,870

(22) PCT Filed: Jun. 26, 2013

(86) PCT No.: PCT/JP2013/067465
§ 371 (c)(1),
(2) Date: Dec. 19, 2014

(87) PCT Pub. No.: WO2014/013850
PCT Pub. Date: Jan. 23, 2014

(65) Prior Publication Data
US 2015/0188141 A1  Jul. 2, 2015

(30) Foreign Application Priority Data
Jul. 17, 2012  (JP) .................................. 2012-158487

(51) Int. Cl.
*H01M 6/16* (2006.01)
*H01M 4/13* (2010.01)
(Continued)

(52) U.S. Cl.
CPC .............. *H01M 4/628* (2013.01); *H01M 4/13* (2013.01); *H01M 4/366* (2013.01); *H01M 4/485* (2013.01);
(Continued)

(58) Field of Classification Search
CPC .... H01M 4/131; H01M 4/134; H01M 10/056; H01M 10/05; H01M 10/0525; H01M 4/13
(Continued)

(56) References Cited

U.S. PATENT DOCUMENTS 5,830,600 A * 11/1998 Narang ................. H01M 6/162
429/199
6,623,886 B2 * 9/2003 Yang ..................... H01M 4/131
429/218.1
(Continued)

FOREIGN PATENT DOCUMENTS

CN  101292389 A  10/2008
CN  101841066 A  9/2010
(Continued)

*Primary Examiner* — Patrick Ryan
*Assistant Examiner* — Julian Anthony
(74) *Attorney, Agent, or Firm* — Sughrue Mion, PLLC (57) ABSTRACT

This invention provides a lithium secondary battery capable of bringing about greater cycle characteristics, being in a 4.2 V or higher class. The lithium secondary battery provided by this invention is a 4.2 V or higher class lithium secondary battery using a lithium transition metal composite oxide as a positive electrode active material. The lithium secondary battery comprises a negative electrode at or around which a silicon-containing cyclic compound and/or a reaction product thereof are present. The silicon-containing cyclic compound comprises at least one silicon atom in its ring and has a vinyl group.

11 Claims, 4 Drawing Sheets

(51) Int. Cl.
| | |
|---|---|
| *H01M 4/58* | (2010.01) |
| *H01M 6/04* | (2006.01) |
| *H01M 4/62* | (2006.01) |
| *H01M 4/505* | (2010.01) |
| *H01M 4/525* | (2010.01) |
| *H01M 10/052* | (2010.01) |
| *H01M 10/0569* | (2010.01) |
| *H01M 4/485* | (2010.01) |
| *H01M 10/058* | (2010.01) |
| *H01M 4/36* | (2006.01) |
| *H01M 10/0525* | (2010.01) |
| *H01M 10/0567* | (2010.01) |
| *H01M 4/131* | (2010.01) |

(52) U.S. Cl.
CPC ........... *H01M 4/505* (2013.01); *H01M 4/525* (2013.01); *H01M 4/62* (2013.01); *H01M 10/052* (2013.01); *H01M 10/058* (2013.01); *H01M 10/0525* (2013.01); *H01M 10/0567* (2013.01); *H01M 10/0569* (2013.01); *H01M 4/131* (2013.01); *H01M 2220/20* (2013.01); *H01M 2300/0034* (2013.01); *Y02E 60/122* (2013.01); *Y02P 70/54* (2015.11); *Y02T 10/7011* (2013.01)

(58) Field of Classification Search
USPC .............................................. 429/218.1, 199
See application file for complete search history.

(56) References Cited

U.S. PATENT DOCUMENTS

| | | | |
|---|---|---|---|
| 2005/0214644 | A1* | 9/2005 | Aramata ................ H01B 1/122 429/218.1 |
| 2007/0243470 | A1* | 10/2007 | Yamamoto ........ H01M 10/0567 429/326 |
| 2009/0317723 | A1 | 12/2009 | Yu et al. |
| 2010/0015514 | A1 | 1/2010 | Miyagi et al. |
| 2010/0233550 | A1 | 9/2010 | Yanagida et al. |

FOREIGN PATENT DOCUMENTS

| | | |
|---|---|---|
| JP | 2004-071458 A | 3/2004 |
| JP | 2007-227368 A | 9/2007 |
| JP | 2009054286 A | 3/2009 |
| JP | 2009054287 A | 3/2009 |
| JP | 2009-163939 A | 7/2009 |
| JP | 2010-503175 A | 1/2010 |
| JP | 2010-044883 A | 2/2010 |
| KR | 10-2008-0056226 A | 6/2008 |

* cited by examiner

LITHIUM SECONDARY BATTERY AND METHOD FOR PRODUCING SAME

TECHNICAL FIELD

The present invention relates to a lithium secondary battery and a method for producing the same. In particular, it relates to a lithium secondary battery applicable to a power supply installed in a vehicle and a production method thereof.

The present application is a National Stage of International Application No. PCT/JP2013/067465 filed Jun. 26, 2013, claiming priority based on Japanese Patent Application No. 2012-158487 filed on Jul. 17, 2012, the entire content thereof is incorporated herein by reference.

BACKGROUND ART

Being lightweight, yet capable of producing high energy densities, lithium secondary batteries are preferably used as so-called portable batteries for PCs and mobile devices, etc., and vehicle-installed batteries. In particular, great importance is placed on them as high-power batteries for driving vehicles such as electric automobiles, hybrid automobiles and the like. In such lithium secondary batteries, it has been suggested to add a cyclic siloxane to non-aqueous electrolyte solutions to increase their cycle characteristics. Literatures disclosing this type of conventional art include Patent Documents 1 to 4.

CITATION LIST

Patent Literature

[Patent Document 1] Japanese Patent Application Publication No. 2004-071458
[Patent Document 2] Japanese Patent Application Publication No. 2007-227368
[Patent Document 3] Japanese Patent Application Publication No. 2009-163939
[Patent Document 4] Japanese Patent Application Publication No. 2010-044883

SUMMARY OF INVENTION

Technical Problem

In a secondary battery that operates at a high positive electrode potential, such as 4.2 V or above, high-voltage charging and discharging tend to lead to transition metal dissolution from the positive electrode active material. The dissolved transition metal deactivates lithium that contributes to charging and discharging, presumably leading to degradation of cycle characteristics. As a result of earnest investigation by the present inventor, a compound has been found to be able to inhibit lithium deactivation caused by the dissolved transition metal, whereby the present invention has been completed.

In particular, the present invention relates to improving a 4.2 V or higher class lithium secondary battery, with an objective thereof being to provide a lithium secondary battery capable of bringing about greater cycle characteristics in the 4.2 V class or higher. Another objective is to provide a method for producing a lithium secondary battery having such properties.

Solution to Problem

To achieve the objectives, this invention provides a 4.2 V or higher class lithium secondary battery using a lithium transition metal composite oxide as a positive electrode active material. At or around the negative electrode constituting the lithium secondary battery, there are present a silicon-containing cyclic compound and/or a reaction product thereof. The silicon-containing cyclic compound comprises at least one silicon atom in its ring and has at least one vinyl group.

According to such a constitution, in a 4.2 V or higher class secondary battery, at least at or around the negative electrode, the silicon-containing cyclic compound that has at least one vinyl group and/or a reaction product thereof act to inhibit degradation of cycle characteristics caused by a transition metal dissolved out from the positive electrode active material. Thus, according to the present invention, greater cycle characteristics can be obtained in a 4.2 V or higher class secondary battery.

The present inventor's investigation has revealed for the first time that the silicon-containing cyclic compound contributes to bring about greater cycle characteristics in a 4.2 V or higher class secondary battery while Patent Documents 1 to 4 have never studied or suggested this. This is also evident, for instance, from the fact that Patent Document 1 uses hexamethylcyclotrisiloxane, which cannot improve cycle characteristics in charging and discharging at 4.2 V or higher (see a worked example described later). The effect by the present invention to bring about greater cycle characteristics is not anticipated in conventional arts.

In this description, the term "4.2 V or higher class lithium secondary battery" refers to a lithium secondary battery whose positive electrode active material has a redox potential (operating voltage) including a 4.2 V (vs L/Li$^+$) or higher range in the 0% SOC to 100% SOC (state of charge) range. Such a secondary battery can also be considered as a lithium secondary battery whose positive electrode's voltage reaches 4.2 V or higher at least in a partial range between 0% SOC and 100% SOC.

In a preferable embodiment of the art disclosed herein, the silicon-containing cyclic compound is a vinyl group-containing cyclic siloxane represented by a formula (1):

[Chem 1]

(1)

(In the formula (1), R$^1$ and R$^2$ are either the same or different with each being an organic group having 1 to 12 carbon atoms, and at least either R$^1$ or R$^2$ includes a vinyl group; and n is a integer between 3 and 10).

In a preferable embodiment of the art disclosed herein, in the silicon-containing cyclic compound, all substituents bonded to the ring-constituting silicon atom(s) are vinyl groups. With such a constitution, cycle characteristics can be increased while reducing the initial resistance in the 4.2 V or higher class secondary battery.

In a preferable embodiment of the art disclosed herein, the positive electrode active material is a spinel lithium transition metal composite oxide comprising Li and further Ni and Mn as transition metals. The spinel lithium transition metal composite oxide is a preferable example of the positive electrode active material whose operating voltage includes a 4.2 V or higher range. In a secondary battery using a positive electrode active material having such a high operating voltage, the silicon-containing cyclic compound can bring about significantly greater cycle characteristics.

In a preferable embodiment of the art disclosed herein, the lithium secondary battery comprises a non-aqueous electrolyte and the non-aqueous electrolyte comprises a fluorinated carbonate as a non-aqueous solvent. In general, non-aqueous electrolytes tend to undergo oxidative decomposition at a high voltage. However, the use of a non-aqueous electrolyte comprising the highly oxidation-resistant fluorinated carbonate inhibits oxidative decomposition of the non-aqueous electrolyte. Such a non-aqueous electrolyte is preferable as a non-aqueous electrolyte for a 4.2 V or higher class secondary battery that charges and discharges at a high voltage.

The present invention also provides a method for producing a 4.2 V or higher class lithium secondary battery. The method comprises obtaining a positive electrode comprising a lithium transition metal composite oxide as a positive electrode active material and a negative electrode; and supplying a silicon-containing cyclic compound at least to the negative electrode. Herein, the silicon-containing cyclic compound comprises at least one silicon atom in its ring and has at least one vinyl group. According to such a constitution, the silicon-containing cyclic compound having at least one vinyl group and/or a reaction product thereof act to inhibit degradation of cycle characteristics caused by a transition metal dissolved out from the positive electrode active material. As a result, greater cycle characteristics will be obtained in the 4.2 V or higher class secondary battery.

In a preferable embodiment of the production method disclosed herein, the supplying the silicon-containing cyclic compound comprises obtaining a non-aqueous electrolyte comprising the silicon-containing cyclic compound, and supplying the non-aqueous electrolyte obtained to an electrode body comprising the positive electrode and the negative electrode. By this means, the silicon-containing cyclic compound is supplied from the non-aqueous electrolyte which may come in contact with the electrode body, preferably producing its effect to bring about greater cycle characteristics.

In a preferable embodiment of the production method disclosed herein, as the silicon-containing cyclic compound, a vinyl group-containing cyclic siloxane represented by the formula (1) is used:

[Chem 2]

(1)

(In the formula (1), $R^1$ and $R^2$ are either the same or different with each being an organic group having 1 to 12 carbon atoms, and at least either $R^1$ or $R^2$ includes a vinyl group; and n is a integer between 3 and 10).

In a preferable embodiment of the production method disclosed herein, in the silicon-containing cyclic compound, all substituents on the ring-constituting silicon atom(s) are vinyl groups. With such a constitution, greater cycle characteristics can be obtained while reducing the initial resistance in the 4.2 V or higher class secondary battery.

In a preferable embodiment of the production method disclosed herein, as the positive electrode active material, a spinel lithium transition metal composite oxide comprising Li and further Ni and Mn as transition metals is used. With the use of a positive electrode active material having such a high operating voltage, the silicon-containing cyclic compound can bring about significantly greater cycle characteristics.

In a preferable embodiment of the production method disclosed herein, the lithium secondary battery comprises a non-aqueous electrolyte and a fluorinated carbonate is used as a non-aqueous solvent in the non-aqueous electrolyte. Such a non-aqueous electrolyte is preferable as a non-aqueous electrolyte for a 4.2 V or higher class secondary battery that charges and discharges at a high voltage.

The present invention provides a non-aqueous electrolyte solution for a secondary battery. The non-aqueous electrolyte solution is applied to a 4.2 V or higher class lithium secondary battery using a lithium transition metal composite oxide as a positive electrode active material. The non-aqueous electrolyte solution comprises a silicon-containing cyclic compound. The silicon-containing cyclic compound comprises at least one silicon atom in its ring and has at least one vinyl group. The present invention further provides a 4.2 V or higher class lithium secondary battery using a lithium transition metal composite oxide as a positive electrode active material. The secondary battery is characterized by being constructed with a non-aqueous electrolyte solution disclosed herein.

The present invention further provides a non-aqueous electrolyte solution for a secondary battery (preferably a lithium secondary battery). The non-aqueous electrolyte solution comprises a silicon-containing cyclic compound. The silicon-containing cyclic compound comprises at least one silicon atom in its ring and has at least one vinyl group. The silicon-containing cyclic compound preferably has a ratio $(V_N/S_{TOTAL})$ of number of vinyl groups $(V_N)$ to total number of substituents bonded to ring-constituting silicon atom(s) $(S_{TOTAL})$ higher than 50%. According to a non-aqueous electrolyte solution comprising such a silicon-containing cyclic compound, greater cycle characteristics can be obtained while reducing the initial resistance in a 4.2 V or higher class secondary battery. Thus, this description provides a non-aqueous electrolyte solution additive comprising the silicon-containing cyclic compound (typically, an additive consisting of a silicon-containing cyclic compound wherein the ratio $(V_N/S_{TOTAL})$ exceeds 50%).

The lithium secondary battery disclosed herein shows excellent cycle characteristics in high-voltage charging and discharging. Thus, with the benefit of this feature, it can be preferably used as a power supply for driving a vehicle such as a hybrid vehicle (HV), plug-in hybrid vehicle (PEW), electric vehicle (EV) and the like. The present invention provides a vehicle equipped with a lithium secondary battery disclosed herein (which may be in a form of a battery system wherein several batteries are connected).

DESCRIPTION OF EMBODIMENTS

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator, the shape, etc., of the battery (case), general techniques related to construction of the battery, etc.) necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, a common reference numeral may be assigned to members or sites producing the same effect, and duplicated descriptions are sometimes omitted or simplified.

Preferable embodiments related to the lithium secondary battery are described below. In this description, the term "secondary battery" refers to a rechargeable battery in general and includes storage batteries (i.e. chemical batteries) such as lithium secondary batteries and the like as well as capacitors (i.e. physical batteries) such as electric double-layer capacitors and the like. The term "lithium secondary battery" in this description refers to a secondary battery that uses lithium ions (Li ions) as electrolytic ions and charges and discharges by means of transfer of charges associated with Li ions between the positive and negative electrodes. To that extent, the "lithium secondary battery" in this description may include, for instance, a secondary battery using, as charge carriers, other non-lithium metal ions (e.g. sodium ions) in combination. Batteries generally called lithium-ion secondary batteries are typical examples included in the lithium secondary battery in the present description.

Figure 1:
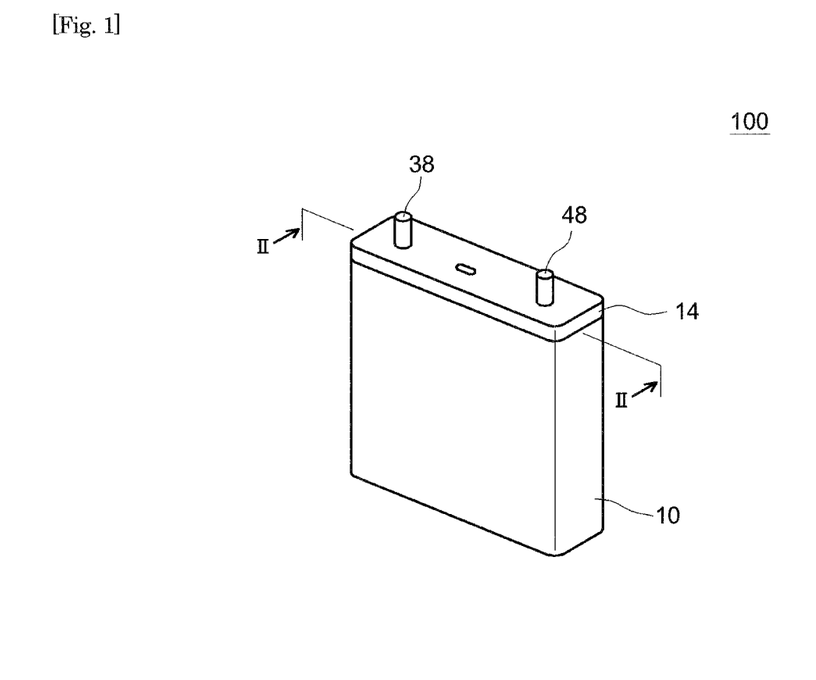
FIG. 1 shows a perspective view schematically illustrating the appearance of the lithium secondary battery according to an embodiment.
Figure 2:
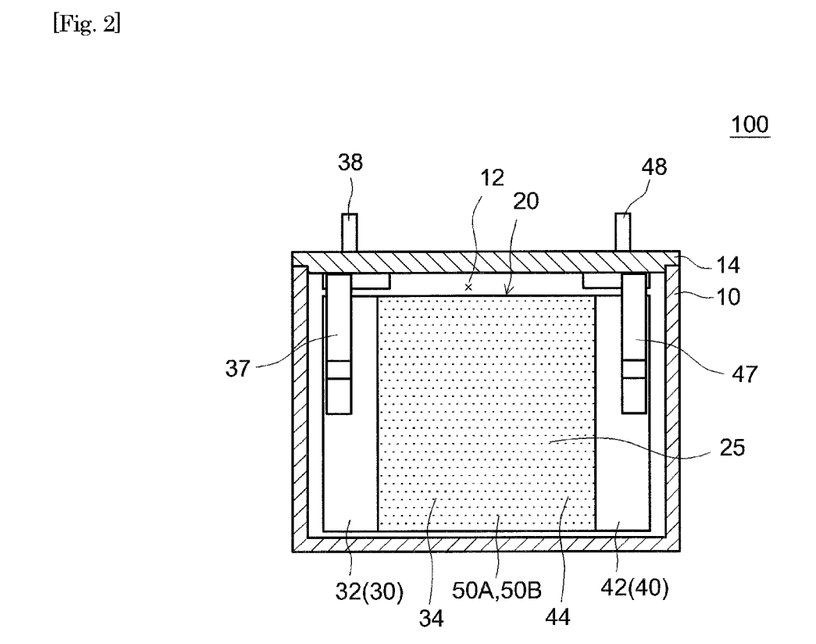
FIG. 2 shows a cross-sectional view taken along the line II-II in FIG. 1.

As shown in FIG. 1 and FIG. 2, a lithium secondary battery 100 comprises a square-shaped battery case 10 and a wound electrode body 20 contained in the battery case 10. Battery case 10 has an opening 12 on the top face. After wound electrode body 20 is placed via opening 12 into battery case 10, the opening 12 is sealed with a lid 14. Battery case 10 further contains a non-aqueous electrolyte (non-aqueous electrolyte solution) 25. Lid 14 is provided with an outer positive terminal 38 and an outer negative terminal 48. Terminals 38 and 48 partially protrude from the surface of lid 14. Part of outer positive terminal 38 is connected to an inner positive terminal 37 inside the battery case 10 while part of outer negative terminal 48 is connected to an inner negative terminal 47 inside the battery case 10.

Figure 3:
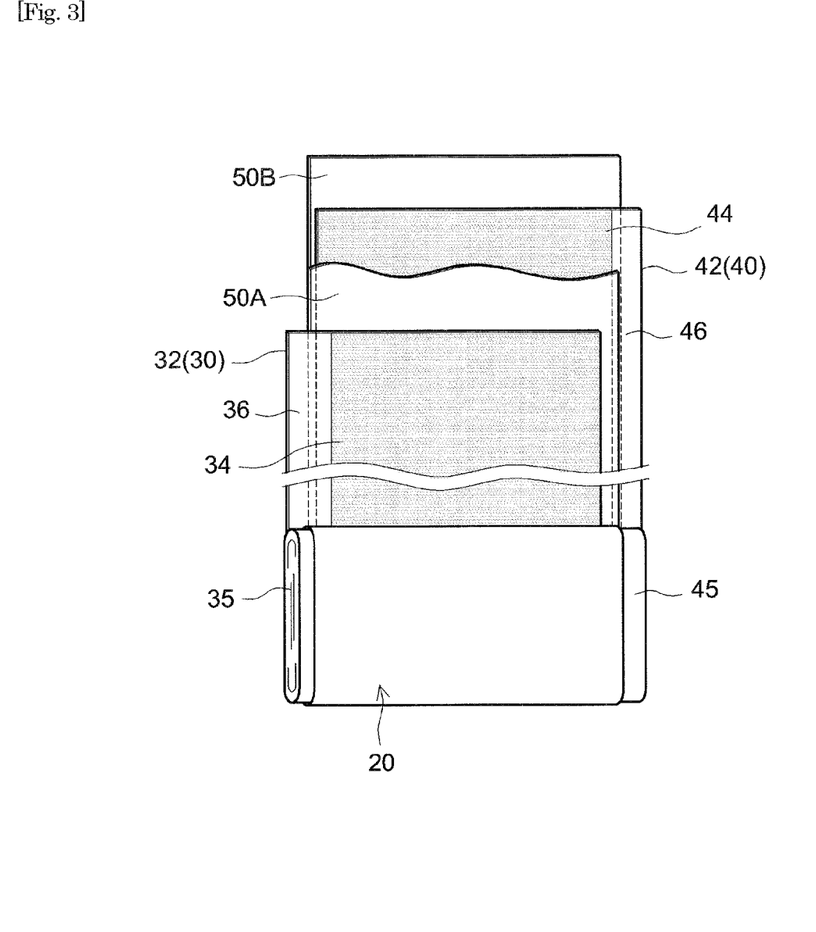
FIG. 3 shows a perspective view schematically illustrating the state of an electrode body according to an embodiment being prepared by means of winding.

As shown in FIG. 3, wound electrode body 20 comprises a long sheet of a positive electrode (positive electrode sheet) 30 and a long sheet of a negative electrode (negative electrode sheet) 40. Positive electrode sheet 30 comprises a length of a positive current collector 32 and a positive electrode material layer 34 formed above at least one (typically each) face thereof. Negative electrode sheet 40 comprises a length of a negative current collector 42 and a negative electrode material layer 44 formed above at least one (typically each) face thereof. Wound electrode body 20 further comprises two long sheets of separator (separator sheets) 50A and 50B. Positive electrode sheet 30 and negative electrode sheet 40 are layered via two separator sheets 50A and 50B, in the order of positive electrode sheet 30, separator sheet 50A, negative electrode sheet 40 and separator sheet 50B. The layered body is wound in the length direction to form a wound body. The wound body is then laterally compressed and flattened to form a flat shape. The electrode body is not limited to a wound electrode body. Depending on the shape and purpose of the battery, for instance, it may have a suitable shape and constitution such as a laminate form, etc.

On the wound electrode body 20, there is formed centrally widthwise (perpendicularly to the winding direction) a portion where the positive electrode material layer 34 formed above the surface of positive current collector 32 and negative electrode material layer 44 formed above the surface of negative current collector 42 are thickly laminated in layers. In positive electrode sheet 30, one edge across the width direction is provided with a portion where positive current collector 32 is exposed with no positive electrode material layer 34 formed thereon (positive electrode material layer-free portion 36). The positive electrode material layer-free portion 36 extends beyond separator sheets 50A, 50B and negative electrode sheet 40. That is, in wound electrode body 20, on one edge across the width direction, there is formed a positive current collector-overlapping portion 35 where the positive electrode material layer-free portion 36 of positive current collector 32 overlaps with itself. On the other edge across the width direction in wound electrode body 20, there is formed also a negative current collector-overlapping portion 45 where the negative electrode material layer-free portion 46 of negative current collector 42 overlaps with itself. Separator sheets 50A and 50B have widths larger than the width of the laminated portion of positive electrode material layer 34 and negative electrode material layer 44, but smaller than the width of wound electrode body 20. These separators placed intermediately in the laminated portion of positive electrode material layer 34 and negative electrode material layer 44 prevent positive electrode material layer 34 and negative electrode material layer 44 from coming into contact with each other and causing internal short-circuit.

The respective components constituting the lithium secondary battery are described next. As the positive current collector constituting the positive electrode (typically a positive electrode sheet) in the lithium secondary battery, a conductive material formed of a metal having good conductivity can be preferably used. As such a conductive material, for example, can be used aluminum or an alloy containing aluminum as the primary component. The shape of positive current collector is not particularly limited as it may vary depending on the shape, etc., of the battery, and may have a variety of shapes such as a rod, plate, sheet, foil, mesh, and so on. The thickness of positive current collector is not particularly limited, either, and can be, for instance, 5 µm to 30 µm. The positive electrode material layer may comprise, in addition to a positive electrode active material, additives such as a conductive material, binder, etc., as necessary.

As the positive electrode active material, can be used one, two or more species among various materials known to be usable as positive electrode active materials in lithium secondary batteries without particular limitations. For instance, can be used a layered or spinel lithium transition metal compound comprising lithium (Li) and at least one species of transition metal as metal constituents, a polyanion-type (e.g. olivine-type) lithium transition metal compound and the like. More specifically, for instance, the following compounds can be used.

(1) A lithium transition metal composite oxide represented by the next general formula (A1): $LiMn_{2-x}M_xO_4$, typically having a spinel structure. Herein, x meets $0 \leq x < 2$, typically $0 \leq x \leq 1$. When x is greater than 0, M may be an arbitrary metal or non-metal excluding Mn. In a preferable compound, M comprises at least one species of transition metal. Specific examples include $LiMn_2O_4$, $LiNi_{0.5}Mn_{1.5}O_4$, $LiCrMnO_4$, etc.

A preferable positive electrode active material is a compound comprising at least Ni as M in the general formula (A1), with examples thereof including a spinel lithium transition metal composite oxide represented by the next general formula (A2): $LiNi_pM^1_qMn_{2-p-q}O_4$. Herein, $0<p$ and $0 \leq q$ while $p+q<2$ (typically $p+q \leq 1$). In a preferable embodiment, $q=0$ and $0.2 \leq p \leq 0.6$. The inclusion of Ni at such a ratio (ratio denoted by p in the general formula (A2)) can increase the positive electrode potential of a spinel LiNiMn composite oxide (e.g. $LiNi_{0.5}Mn_{1.5}O_4$) (typically to 4.5 V (vs. Li/Li$^+$) or higher) at charge completion, making it possible to construct a 5 V class lithium secondary battery. When $0<q$ in the general formula (A2), $M^1$ may be an arbitrary metal or non-metal excluding Ni and Mn (e.g. one, two or more species selected from Fe, Co, Cu, Cr, Zn and Al). $M^1$ preferably comprises at least either trivalent Fe or Co. It is also preferable to satisfy $0<q \leq 0.3$ and $1 \leq 2p+q$.

(2) A lithium transition metal composite oxide represented by a general formula $LiMO_2$, typically having a layered structure. Herein, M comprises at least one species of transition metal such as Ni, Co, Mn, etc., and may further comprise other metal(s) or non-metal(s). Specific examples include $LiNiO_2$, $LiNi_{1/3}Co_{1/3}Mn_{1/3}O_2$ and the like.

(3) A lithium transition metal composite oxide represented by a general formula $Li_2MO_3$. Herein, M comprises at least one species of transition metal such as Mn, Fe, Co, etc., and may further comprise other metal(s) or non-metal(s). Specific examples include $Li_2MnO_3$, $Li_2PtO_3$ and the like.

(4) A lithium transition metal compound (phosphate) represented by a general formula $LiMPO_4$. Herein, M comprises at least one species of transition metal such as Mn, Fe, Ni, Co, etc., and may further comprise other metal(s) or non-metal(s). Specific examples include $LiMnPO_4$, $LiFePO_4$ and the like.

(5) A lithium transition metal compound (phosphate) represented by a general formula $Li_2MPO_4F$. Herein, M comprises at least one species of transition metal such as Mn, Ni, Co, etc., and may further comprise other metal(s) or non-metal(s). Specific examples include $Li_2MnPO_4F$ and the like.

(6) A solid solution of $LiMO_2$ and $Li_2MO_3$. Herein, $LiMO_2$ refers to a composition represented by the general formula shown in (2) above while $Li_2MO_3$ refers to a composition represented by the general formula shown in (3) above. A specific example is a solid solution represented by $0.5LiNi_{1/3}Mn_{1/3}Co_{1/3}O_2\text{-}0.5Li_2MnO_3$.

In a preferable embodiment, as the positive electrode active material, a material having an operating voltage (vs. Li/Li$^+$) higher than that of a general lithium secondary battery (about 4.1 V upper voltage limit) at least in a partial range between 0% SOC and 100% SOC. For example, can be preferably used a positive electrode active material having an operating voltage of 4.2 V (vs. Li/Li$^+$) or higher. In other words, a positive electrode active material whose maximum operating voltage is 4.2 V (vs. Li/Li$^+$) or higher in the range from 0% SOC to 100% SOC can be preferably used. The use of such a positive electrode active material can bring about a lithium secondary battery whose positive electrode operates at a voltage of 4.2 V (vs. Li/Li$^+$) or higher. Preferable examples of such a positive electrode active material include $LiNi_pMn_{2-p}O_4$ ($0.2 \leq P \leq 0.6$; e.g. $LiNi_{0.5}Mn_{1.5}O_4$), $LiMn_2O_4$, $LiNiPO_4$, $LiCoPO_4$, $LiMnPO_4$, $LiNi_{1/3}CO_{1/3}Mn_{1/3}O_2$, $0.5LiNi_{1/3}Mn_{1/3}Co_{1/3}O_2\text{-}0.5Li_2MnO_3$ and the like. The positive electrode active material has an operating voltage (vs. Li/Li$^+$) of preferably 4.3 V or higher (e.g. 4.35 V or higher, even 4.5 V or higher), or particularly preferably 4.6 V or higher (e.g. 4.8 V or higher, even 4.9 V or higher). While the upper limit of the operating voltage (vs. Li/Li$^+$) is not particularly limited, it can be 5.5 V or lower (e.g. 5.3 V or lower, typically 5.1 V or lower).

Herein, the operating potential of a positive electrode active material can be determined as follows. In particular, a three-electrode cell is constructed with a positive electrode comprising a positive electrode active material to be measured, a lithium metal piece as a counter electrode, another lithium metal piece as a reference electrode, and an electrolyte solution containing approximately 1 mol/L LiPF$_6$ in a mixed solvent at an ethylene carbonate (EC) to dimethyl carbonate (DMC) ratio of 30:70 (by volume). Based on the theoretical capacity of the cell, the SOC value of the cell is changed by a 5% increment from 0% SOC to 100% SOC. For instance, it is adjusted by constant-current charging. The cell adjusted to each SOC value is left for one hour and then subjected to a measurement of positive electrode potential. The measured positive electrode potential (vs. Li/Li$^+$) is recorded as the operating potential of the positive electrode active material at this SOC value. In general, the operating potential of a positive electrode active material is maximized over a SOC range that includes 100% SOC. Thus, the upper operating potential limit of the positive electrode active material (e.g., whether or not it is above 4.2 V) can be usually assessed based on the operating potential of the positive electrode active material at 100% SOC (i.e., when fully charged).

The positive electrode active material is usually preferably in a form of particles having an average particle diameter of about 1 µm to 20 µm (e.g. 2 µm to 10 µm). Unless otherwise specified, the term "average particle diameter" in the present description refers to a particle diameter at 50% cumulative volume in a size distribution measured by a size distribution analyzer based on laser scattering/diffraction, that is, a 50% volume average particle diameter.

As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used.

Examples of the binder include various polymer materials. For instance, when the positive electrode material layer is formed with an aqueous composition (a composition wherein water or a mixed solvent primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate based polymers; rubbers such as styrene-butadiene rubber (SBR), acrylic acid-modified SBR resins (SBR-based latexes), etc.; and the like. Alternatively, when the positive electrode material layer is formed with a solvent-based composition (a composition whose dispersion medium for active material particles primarily comprises an organic solvent), can be used polymer materials including vinyl halide resins such as polyvinylidene fluoride (PVDF), polyvinylidene chloride (PVDC), etc.; polyalkylene oxides such as polyethylene oxide (PEO), etc.; and the like. These binders can be used singly as one species or in combination of two or more species. The polymer materials exemplified above may be used also as thickeners or other additives in the positive electrode material layer-forming composition, besides being used as the binder.

The positive electrode active material content in the positive electrode material layer is higher than about 50% by mass, or preferably about 70% by mass to 97% by mass (e.g. 75% by mass to 95% by mass). The additive content in the positive electrode material layer is not particularly limited. The conductive material content is preferably about 1 part by mass to 20 parts by mass (e.g. 2 parts by mass to 10 parts by mass, typically 3 parts by mass to 7 parts by mass) relative to 100 parts of positive electrode active material. The binder content is preferably about 0.8 part by mass to 10 parts by mass (e.g. 1 part by mass to 7 parts by mass, typically 2 parts by mass to 5 parts by mass) relative to 100 part by mass of positive electrode active material.

The method for fabricating a positive electrode as described above is not particularly limited and a conventional method can be suitably used. For instance, it can be fabricated by the following method. First, a positive electrode active material and, as necessary, a conductive material, binder, etc., are mixed with a suitable solvent (an aqueous solvent, non-aqueous solvent or a mixed solvent of these) to prepare a paste-like or slurry positive electrode material layer-forming composition. The mixing can be carried out, for instance, using a suitable mixer (a planetary mixer, homodisper, clearmix, filmix, etc.). For the solvent used to prepare the composition, any of aqueous solvents and non-aqueous solvents can be used. The aqueous solvent should just show aqueous properties, and water or a solvent mixture primarily comprising water can be preferably used. Preferable examples of non-aqueous solvents include N-methyl-2-pyrrolidone (NMP), methyl ethyl ketone, toluene, etc.

The composition thus prepared is applied to a positive current collector and then pressed after the solvent is allowed to evaporate off by drying. As a method for applying the composition to the positive current collector, can be suitably employed a technique similar to conventionally-known methods. For example, with a suitable applicator such as slit coater, die coater, gravure coater, comma coater, etc., the composition can be preferably applied to the positive current collector. The solvent can be dried off well by employing one or a combination of natural drying, heated air, low-humidity air, vacuum, infrared rays, far-infrared rays and electron beam. As a pressing method, can be employed a compression method such as a conventionally-known roll-pressing method or a flat-press method, etc. To adjust the thickness, the thickness can be measured with a thickness gauge and pressed several times to a desirable thickness by adjusting the press pressure. A positive electrode can be thus obtained having a positive electrode material layer formed on the positive current collector.

The coating weight of positive electrode material layer (non-volatile-based coating amount of positive electrode material layer-forming composition) per unit surface area of positive current collector is not particularly limited. From the standpoint of obtaining sufficient conductive paths (conducing paths), it is preferably 3 mg/cm$^2$ or greater (e.g. 5 mg/cm$^2$ or greater, typically 6 mg/cm$^2$ or greater), but 45 mg/cm$^2$ or less (e.g. 28 mg/cm$^2$ or less, typically 15 mg/cm$^2$ or less) per face of positive current collector.

As the negative current collector constituting the negative electrode (typically a negative electrode sheet), can be preferably used a conductive member formed of a metal having a good conductivity. For example, can be used copper or an alloy comprising copper as the primary component. The shape of negative current collector is not particularly limited as it may vary in accordance with the shape of the battery, etc. It may be in various forms including shapes of a rod, plate, sheet, foil, mesh, and so on. The thickness of negative current collector is not particularly limited, either. It can be about 5 μm to 30 μm.

The negative electrode material layer comprises a negative electrode active material capable of storing and releasing lithium ions serving as charge carriers. The composition or form of the negative electrode active material is not particularly limited. Among materials conventionally used in lithium secondary batteries, one, two or more species can be used. Examples of such negative electrode active materials include carbon materials generally used in lithium secondary batteries. Typical examples of such carbon materials include graphite carbons (graphite), amorphous carbons and the like. It is preferable to use a granular carbon material (carbon particles) containing a graphite structure (layered structure) at least partially. In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used. As other negative electrode active materials, oxides such as lithium titanate, etc.; silicon materials, tin materials and so on can be used singly, as an alloy, as a compound formed therefrom or as a composite material combining these materials. The negative electrode active material content in the negative electrode material layer is greater than about 50% by mass and preferably about 90% by mass to 99% by mass (e.g. 95% by mass to 99% by mass, typically 97% by mass to 99% by mass).

The negative electrode material layer may comprise, besides the negative electrode active material, one, two or more species of binder, thickener and other additives that can be used in a negative electrode material layer in a general lithium secondary battery. Binders include various polymer materials. For example, with respect to an aqueous composition or a solvent-based composition, those that can be contained in the positive electrode material layer may be preferably used. Such binder may be used, not just as a binder, but also as a thickener or other additive in a negative electrode material layer-forming composition. The additive content in the negative electrode material layer is not particularly limited. It is preferably about 0.8% by mass to 10% by mass (e.g. about 1% by mass to 5% by mass, typically 1% by mass to 3% by mass).

The method for fabricating a negative electrode is not particularly limited and a conventional method can be employed. For instance, it can be fabricated by the following method. First, a negative electrode active material is mixed along with a binder, etc., in an aforementioned suitable solvent (an aqueous solvent, organic solvent or a mixed solvent of these) to prepare a paste-like or slurry negative electrode material layer-forming composition. The composition thus prepared is applied to a negative current collector and then pressed after the solvent is allowed to evaporate off by drying. A negative electrode material layer can be thus formed with the composition on the negative current collector to obtain a negative electrode comprising the negative electrode material layer. For the mixing, coating, drying and pressing methods, means similar to those for the positive electrode fabrication can be employed.

The coating weight of negative electrode material layer (non-volatile-based coating amount of negative electrode material layer forming composition) per unit surface area of negative current collector is not particularly limited. From the standpoint of obtaining sufficient conductive paths (conducing paths), it is preferably 2 mg/cm$^2$ or greater (e.g. 3 mg/cm$^2$ or greater, typically 4 mg/cm$^2$ or greater), but 40 mg/cm$^2$ or less (e.g. 22 mg/cm$^2$ or less, typically 10 mg/cm$^2$ or less) per face of negative current collector.

In the lithium secondary battery in the art disclosed herein, the silicon-containing cyclic compound and/or a reaction product thereof may be present at or around the negative electrode (typically on the negative electrode surface, possibly inside the negative electrode (typically inside the negative electrode material layer)). The silicon-containing cyclic compound in the art disclosed herein comprises at least one silicon atom (Si) in its ring and has at least one vinyl group. With the silicon-containing cyclic compound having a Si-containing ring structure and a vinyl group, at least at or around the negative electrode, the compound and/or a reaction product thereof can act to inhibit degradation of cyclic properties caused by a transition metal dissolved out from the positive electrode active material.

More specifically, a transition metal (typically Mn) dissolved out from the positive electrode due to high-voltage charging and discharging precipitates out, for instance, on the negative electrode surface. Presumably, this deactivates lithium that could contribute to charging and discharging, leading to the occurrence of degradation of cycle characteristics. Thus, when included in the battery to be possibly present at or around the negative electrode (typically on the negative electrode surface), the silicon-containing cyclic compound precipitates out (typically forms a coating) on an electrode surface (mainly on the negative electrode surface). The precipitate (coating) is considered to act to inhibit the lithium deactivation and contribute to suppress degradation of cycle characteristics. By the present inventor, it has been found that the effect of bringing about greater cycle characteristics cannot be obtained with a silicon-containing compound that has a vinyl group, but not a cyclic structure (e.g. a linear or branched compound, typically a vinyl group-containing acyclic siloxane) or with a silicon-containing cyclic compound free of a vinyl group (typically, a vinyl group-free cyclic siloxane). While the mechanism has not been revealed, it is presumed that the presence of a cyclic structure and a vinyl group is important in bringing about greater cycle characteristics.

As described above, the term "silicon-containing cyclic compound and/or a reaction product thereof" refers to a component (typically a precipitate) formed from the silicon-containing compound and can be considered to comprise at least either the silicon-containing cyclic compound or a reaction product thereof. The presence of a precipitate (coating) formed from a silicon-containing compound can be assessed, for instance, by analyzing samples collected from electrode surfaces by a known analytical means such as ICP (high frequency inductive coupling plasma) emission analysis, etc.

In the silicon-containing cyclic compound, at least one ring-constituting atom is a silicon atom (Si). The number of atoms constituting the ring is not particularly limited. In view of the coating formation, etc., it is suitably 3 to 20, or preferably 3 to 12 (e.g. 3 to 10, typically 8). The atoms constituting the ring preferably comprise Si and oxygen (O) atoms or more preferably consist of Si and O atoms. In typical, it may be a so-called cyclic siloxane in which Si and O atoms are alternately connected.

The silicon-containing cyclic compound comprises at least one vinyl group. While the number of vinyl groups is not particularly limited as long as there is at least one, it is suitably 1 to 20 or preferably 2 to 12 (e.g. 3 to 10, typically 4 to 6). It is preferable that at least one vinyl group (e.g. two or more vinyl groups, typically all vinyl groups) is bonded to the ring-constituting silicon atom(s).

From the standpoint of reducing the initial resistance, the silicon-containing cyclic compound preferably has a ratio $(V_N/S_{TOTAL})$ of number of vinyl groups $(V_N)$ to total number of substituents bonded to ring-constituting silicon atom $(S_{TOTAL})$ higher than 50%. The ratio $(V_N/S_{TOTAL})$ is more preferably 70% or higher (e.g. 80% or higher, typically 90% or higher). In the silicon-containing cyclic compound disclosed herein, it is particularly preferable that all substituents bonded to the ring-constituting silicon atom(s) are vinyl groups. In other words, a silicon-containing cyclic compound with the ratio $(V_N/S_{TOTAL})$ being 100% is particularly preferable.

Preferable examples of the silicon-containing cyclic compound disclosed herein include a vinyl group-containing cyclic siloxane represented by a formula (1):

[Chem 3]

(1)

Herein, in the formula (1), R$^1$ and R$^2$ are each an organic group having 1 to 12 carbon atoms. R$^1$ and R$^2$ can be the same or different. At least either R$^1$ or R$^2$ comprises a vinyl group while n is an integer between 3 and 10.

In the formula (1), R$^1$ and R$^2$ may be each an organic group having 1 to 12 carbon atoms. From the standpoint of suitably bringing about the effect by the cyclic siloxane, the number of carbon atoms is preferably 1 to 6 (e.g. 1 to 4, typically 1 or 2). Examples of such organic groups include linear alkyl groups such as methyl, ethyl, n-propyl, isopropyl, n-butyl, isobutyl, sec-butyl, t-butyl, n-pentyl, 1-methylbutyl, 2-methylbutyl, 3-methylbutyl, 1-methyl-2-methlpropyl, 2,2-dimethylpropyl, hexyl, heptyl, octyl, nonyl, decyl, etc.; cyclic alkyl groups such as cyclohexyl, norbornanyl, etc.; alkenyl groups such as vinyl, 1-propenyl, allyl, butenyl, 1,3-butadienyl, etc.; alkynyl groups such as ethynyl, propynyl, butynyl, etc.; halogenated alkyl groups such as trifluoropropyl, etc.; saturated heterocyclic group-containing alkyl groups such as 3-pyrrolizinopropyl, etc.; aryl groups such as a phenyl group which may have an alkyl group, etc.; aralkyl groups such as phenylmethyl, phenylethyl, etc.; trialkylsilyl groups such as trimethylsilyl, etc.; trialkylsiloxyl groups such as trimethylsiloxyl, etc.; and the like. In particular, from the standpoint of suitably bringing about the effect by the cyclic siloxane, the organic group is preferably a methyl, ethyl, vinyl, propenyl, or phenyl group, with the methyl and vinyl groups being particularly preferable.

In the formula (1), at least either $R^1$ or $R^2$ comprises a vinyl group. Preferably, at least either $R^1$ or $R^2$ is a vinyl group. Alternatively, at least either $R^1$ or $R^2$ is an organic group containing a vinyl group. As such vinyl group-containing organic groups, alkenyl groups are cited. The number of carbon atoms in an alkenyl group is not particularly limited. From the standpoint of suitably bringing about the effect by the cyclic siloxane, it is suitably 3 to 8 (e.g. 3 to 6, typically 3 or 4). Specific examples of alkenyl groups include allyl, butenyl, 1,3-butadienyl, pentenyl, hexenyl, heptenyl, and octenyl groups. In particular, at least either $R^1$ or $R^2$ (typically only one between $R^1$ and $R^2$, or each of $R^1$ and $R^2$) is preferably a vinyl group. From the standpoint of reducing the initial resistance, each of $R^1$ and $R^2$ is preferably a vinyl group.

In the formula (1), n is an integer between 3 and 10. From the standpoint of bringing about greater cycle characteristics at a high voltage, n is preferably an integer between 3 and 6, more preferably an integer between 4 and 6, or particularly preferably 4.

Specific examples of the vinyl group-containing cyclic siloxane include a vinyl group-containing cyclotrisiloxane, vinyl group-containing cyclotetrasiloxane, vinyl group-containing cyclopentasiloxane, vinyl group-containing cyclohexasiloxane, vinyl group-containing cycloheptasiloxane, vinyl group-containing cyclooctasiloxane, vinyl group-containing cyclononasiloxane and vinyl group-containing cyclodecasiloxane. In particular, from the standpoint of bringing about greater cycle characteristics at a high voltage, a vinyl group-containing cyclotetrasiloxane, vinyl group-containing cyclopentasiloxane and vinyl group-containing cyclohexasiloxane are preferable, with the vinyl group-containing cyclotetrasiloxane being particularly preferable.

Examples of a vinyl group-containing cyclotrisiloxane include a cyclotrisiloxane having one vinyl group such as 2-vinyl-2,4,4,6,6-pentamethylcyclotrisiloxane, etc.; a cyclotrisiloxane having two vinyl groups such as 2,4-divinyl-2,4,6,6-tetramethylcyclotrisiloxane, etc.; a cyclotrisiloxane having three vinyl groups such as 2,4,6-trivinyl-2,4,6-trimethylcyclotrisiloxane, etc.; a cyclotrisiloxane having four vinyl groups such as 2,4,6,6-tetravinyl-2,4-dimethylcyclotrisiloxane, etc.; a cyclotrisiloxane having five vinyl groups such as 2,4,4,6,6-pentavinyl-2-methylcyclotrisiloxane, etc.; a cyclotrisiloxane having six vinyl groups such as hexavinylcyclotrisiloxane (2,2,4,4,6,6-hexavinylcyclotrisiloxane), etc.; and the like. For example, 2,4,6-trivinyl-2,4,6-trimethylcyclotrisiloxane and hexavinylcyclotrisiloxane are each a compound in which every Si atom constituting the ring of the cyclic siloxane has a vinyl group bonded thereto. Hexavinylcyclotrisiloxane is also a compound in which a Si atom (typically every Si atom) constituting the ring of the cyclic siloxane has two vinyl groups bonded thereto. In particular, 2,4,6-trivinyl-2,4,6-trimethylcyclotrisiloxane is preferable. From the standpoint of reducing the initial resistance, a cyclotrisiloxane having four or more (e.g. five or six) vinyl groups is preferable while hexavinylcyclotrisiloxane is more preferable.

Examples of a vinyl group-containing cyclotetrasiloxane include a cyclotetrasiloxane having one vinyl group such as 2-vinyl-2,4,4,6,6,8,8-pentamethylcyclotetrasiloxane, etc.; a cyclotetrasiloxane having two vinyl groups such as 2,4-divinyl-2,4,6,6,8,8-hexamethylcyclotetrasiloxane, etc.; a cyclotetrasiloxane having three vinyl groups such as 2,4,6-trivinyl-2,4,6,8,8-pentamethylcyclotetrasiloxane, etc.; a cyclotetrasiloxane having four vinyl groups such as 2,4,6,8-tetravinyl-2,4,6,8-tetramethylcyclotetrasiloxane, etc.; a cyclotetrasiloxane having five vinyl groups such as 2,4,6,8,8-pentavinyl-2,4,6-trimethylcyclotetrasiloxane, etc.; a cyclotetrasiloxane having six vinyl groups such as 2,4,6,6,8,8-hexavinyl-2,4-dimethylcyclotetrasiloxane, etc.; a cyclotetrasiloxane having seven vinyl groups such as 2,4,4,6,6,8,8-heptavinyl-2-methylcyclotetrasiloxane, etc.; a cyclotetrasiloxane having eight vinyl groups such as octavinylcyclotetrasiloxane (2,2,4,4,6,6,8,8-octavinylcyclotetrasiloxane), etc.; and the like. For instance, 2,4,6,8-tetravinyl-2,4,6,8-tetramethylcyclotetrasiloxane and octavinylcyclotetrasiloxane are each a compound in which every Si atom constituting the ring of the cyclic siloxane has a vinyl group bonded thereto. Octavinylcyclotetrasiloxane is also a compound in which a Si atom (typically every Si atom) constituting the ring of the cyclic siloxane has two vinyl groups bonded thereto. In particular, 2,4,6,8-tetravinyl-2,4,6,8-tetramethylcyclotetrasiloxane is preferable. From the standpoint of reducing the initial resistance, a cyclotetrasiloxane having five or more (e.g. six, seven or eight) vinyl groups while octavinylcyclotetrasiloxane is more preferable.

Examples of a vinyl group-containing cyclopentasiloxane include 2-vinyl-2,4,4,6,6,8,8,10,10-nonamethylcyclopentasiloxane, 2,4,6,8,10-pentavinyl-2,4,6,8,10-pentamethylcyclopentasiloxane, 2,4,6,6,8,8,10,10-octavinyl-2,4-dimethylcyclopentasiloxane, 2,4,4,6,6,8,8,10,10-nonavinyl-2-methylcyclopentasiloxane, decavinylcyclopentasiloxane (2,2,4,4,6,6,8,8,10,10-decavinylcyclopentasiloxane), and the like. Examples of a vinyl group-containing cyclohexasiloxane include 2,4,6,8,10,12-hexavinyl-2,4,6,8,10,12-hexamethylcyclohexasiloxane, 2,4,6,6,8,8,10,10,12,12-decavinyl-2,4-dimethylcyclohexasiloxane, 2,2,4,4,6,6,8,8,10,10,12,12-dodecavinylcyclohexasiloxane, and the like. Examples of a vinyl group-containing cycloheptasiloxane include 2,4,6,8,10,12,14-heptavinyl-2,4,6,8,10,12,14-heptamethylcycloheptasiloxane, 2,2,4,4,6,6,8,8,10,10,12,12,14,14-tetradecavinylcycloheptasiloxane, and the like. Examples of a vinyl group-containing cyclooctasiloxane include 2,4,6,8,10,12,14,16-octavinyl-2,4,6,8,10,12,14,16-octamethylcyclooctasiloxane, 2,2,4,4,6,6,8,8,10,10,12,12,14,14,16,16-hexadecavinylcyclooctasiloxane, and the like. Examples of a vinyl group-containing cyclononasiloxane include 2,4,6,8,10,12,14,16,18-nonavinyl-2,4,6,8,10,12,14,16,18-nonamethylcyclononasiloxane, 2,2,4,4,6,6,8,8,10,10,12,12,14,14,16,16,18,18-octadecavinylcyclononasiloxane, and the like. Examples of a vinyl group-containing cyclodecasiloxane include 2,4,6,8,10,12,14,16,18,20-decavinyl-2,4,6,8,10,12,14,16,18,20-decamethylcyclodecasiloxane, and the like.

The separator (separator sheet) placed so as to separate the positive electrode and negative electrode should be formed of a material that insulates the positive electrode material layer and negative electrode material layer while allowing transport of the electrolyte. A preferable example of separator is constituted with a porous polyolefin-based resin. For instance, can be preferably used an about 5 μm to 30 μm thick separator sheet made of a synthetic resin (e.g. a polyethylene, polypropylene, polyolefin having a structure including two or more layers of these in combination). The separator sheet may be provided with a heat-resistant layer. Alternatively, when, instead of a liquid-form electrolyte (electrolyte solution), a solid-form (gel-form) electrolyte comprising the aforementioned electrolyte and a polymer added thereto is used, the electrolyte itself may serve as a separator, necessitating no separator.

The non-aqueous electrolyte injected into the lithium secondary battery may comprise at least a non-aqueous solvent and a supporting salt. A typical example is an electrolyte solution having a composition comprising a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-cliethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc., among which solely one species or a mixture of two or more species can be used. In particular, a solvent mixture of EC, DMC and EMC is preferable.

The non-aqueous electrolyte solution preferably comprises, as the non-aqueous solvent, one, two or more species of fluorinated carbonate (e.g. a fluoride of an aforementioned carbonate). Either a fluorinated cyclic carbonate or fluorinated acyclic carbonate can be preferably used. Usually, it is preferable to use a fluorinated carbonate having one carbonate moiety per molecule. The F-substitution ratio in such a fluorinated carbonate is usually suitable to be 10% or greater, or for instance, it can be 20% or greater (typically 20% or greater, but smaller than 100%, e.g., 20% or greater, but 80% or smaller).

The fluorinated carbonate preferably exhibits an oxidation potential equal to or higher than the operating potential (vs. Li/Li$^+$) of the positive electrode active material. As such a fluorinated carbonate, it is preferable to use, for example, one having an oxidation potential higher than the operating potential (vs. Li/Li$^+$) of the positive electrode active material by greater than 0 V (typically by about 0.1 V to 3.0 V, preferably by about 0.2 V to 2.0 V, e.g., by about 0.3 V to 1.0 V), by greater than 0V but less than about 0.3 V, or by 0.3 V or greater (typically by about 0.3 V to 3.0 V, preferably by about 0.3 V to 2.0 V, e.g., by about 0.3 V to 1.5 V).

A preferable fluorinated cyclic carbonate has 2 to 8 (more preferably 2 to 6, e.g., 2 to 4, typically 2 or 3) carbon atoms. With too many carbon atoms, the viscosity of the non-aqueous electrolyte solution may increase, or the ionic conductivity may decrease. For instance, a fluorinated cyclic carbonate represented by the following formula (C1) can be preferably used.

[Chem 4]

(C1)

In the formula (C1), each of $R^{11}$, $R^{12}$ and $R^{13}$ can be independently selected from a hydrogen atom, a fluorine atom, alkyl groups and haloalkyl groups having 1 to 4 (more preferably 1 or 2, typically 1) carbon atom(s), and other halogen atoms (preferably a chlorine atom) besides fluorine atom. The haloalkyl group may have a structure obtained by substituting one, two or more hydrogen atoms of the alkyl group with halogen atom(s) (e.g., fluorine atom(s) or chlorine atom(s), preferably fluorine atom(s)). In a preferable compound, one or two of $R^1$, $R^{12}$ and $R^{13}$ are fluorine atom(s). For instance, a compound with at least one of $R^{12}$ and $R^{13}$ being a fluorine atom is preferable. From the standpoint of decreasing the viscosity of the non-aqueous electrolyte solution, can be preferably used a compound in which each of $R^{11}$, $R^{12}$ and $R^{13}$ is a fluorine atom or a hydrogen atom.

Specific examples of the fluorinated cyclic carbonate represented by the formula (C1) include mono-fluoroethylene carbonate (MFEC), difluoroethylene carbonate, 4,4-difluoroethylene carbonate, trifluoroethylene carbonate, perfluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate, and the like. As the difluoroethylene carbonate (DFEC), can be used either of trans-difluoroethylene carbonate (trans-DFEC) and cis-difluoroethylene carbonate (cis-DFEC). Use of trans-DFEC is usually preferable. Since trans-DFEC is present as a liquid at room temperature (e.g., 25° C.), it is advantageous in terms of the handling properties as compared to cis-DFEC which is present as a solid at room temperature.

As the non-aqueous electrolyte solution in the art disclosed herein, for instance, a fluorinated acyclic carbonate represented by the next formula (C2) can be used.

[Chem 5]

(C2)

At least either $R^{21}$ or $R^{22}$ (preferably each of these) in the formula (C2) is a F-containing organic group, and it can be, for example, a fluorinated alkyl group or a fluorinated alkyl ether group. It can be a fluorinated alkyl group or a fluorinated alkyl ether group that has been further substituted with a halogen atom other than a fluorine atom. One of $R^{21}$ and $R^{22}$ may be an organic group (e.g., an alkyl group or an alkyl ether group) not containing a fluorine atom. Each of $R^{21}$ and $R^{22}$ is preferably an organic group having 1 to 6 (more preferably 1 to 4, e.g., 1 to 3, typically 1 or 2) carbon atoms. With too many carbon atoms, the viscosity of the non-aqueous electrolyte solution may increase, or the ionic conductivity may decrease. For similar reasons, in usual, it is preferable that at least one of $R^{21}$ and $R^{22}$ is a straight chain, and it is more preferable that each of $R^{21}$ and $R^{22}$ is a straight chain. For instance, it is preferable to use a fluorinated acyclic carbonate in which each of $R^{21}$ and $R^{22}$ is a fluoroalkyl group with each containing a total of one or two carbon atom(s).

Specific examples of the fluorinated acyclic carbonate represented by the formula (C2) include fluoromethyl methyl carbonate, difluoromethyl methyl carbonate, trifluoromethyl methyl carbonate, fluoromethyl difluoromethyl carbonate, bis(fluoromethyl) carbonate, bis(difluoromethyl) carbonate, bis(trifluoromethyl) carbonate, 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, ethyl 2-fluoroethyl carbonate, ethyl 2,2-difluoroethyl carbonate, bis(2-fluoroethyl) carbonate, ethyl 2,2,2-trifluoroethyl carbonate, 2,2-difluoroethyl 2'-fluoroethyl carbonate, bis(2,2-difluoroethyl)carbonate, 2,2,2-trifluoroethyl 2'-fluoroethyl carbonate, 2,2,2-trifluoroethyl 2',2'-difluoroethyl carbonate, bis(2,2,2-trifluoroethyl) carbonate, pentafluoroethyl methyl carbonate, pentafluoroethyl fluoromethyl carbonate, pentafluoroethyl ethyl carbonate, bis (pentafluoroethyl) carbonate, and the like.

The amount of the fluorinated carbonate is preferably, for instance, 2% by volume or more (e.g. 5% by volume or more, typically 10% by volume or more) of all components in the non-aqueous electrolyte solution excluding the supporting salt (or "non-supporting-salt components" hereinafter). Essentially 100% by volume (typically 99% by volume or more) of the non-supporting-salt components may be a fluorinated carbonate. Usually, from the standpoint of reducing the viscosity of the non-aqueous electrolyte solution or increasing its ion conductivity, the amount of fluorinated carbonate in the non-supporting-salt components is preferably 90% by volume or less (e.g. 70% by volume or less, typically 60% by volume or less).

Other preferable examples include a non-aqueous electrolyte solution comprising a non-aqueous solvent that comprises a dialkyl carbonate whose alkyl group has 1 to 4 carbon atoms (e.g. DEC) and a fluorinated carbonate (e.g. DFEC) at a volume ratio of 1:9 to 9:1 (e.g. 3:7 to 7:3, typically 4:6 to 6:4) with their combined amount accounting for 50% by volume or more (e.g. 70% by volume or more, typically 90% by volume or more, but 100% by volume or less) of the non-supporting-salt components.

As the supporting salt, for example, can be used one, two or more species of lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

From the standpoint of bringing about greater cycle characteristics, the non-aqueous electrolyte (typically a non-aqueous electrolyte solution) preferably comprises an aforementioned silicon-containing cyclic compound. The silicon-containing cyclic compound content (amount added) in the non-aqueous electrolyte (typically a non-aqueous electrolyte solution) is not particularly limited. From the standpoint of obtaining a sufficient effect to bring about greater cycle characteristics, it is preferably 0.01% by mass or more (e.g. 0.1% by mass or more, typically 0.3% by mass or more). From the standpoint of inhibiting degradation of battery properties (typically a resistance increase) caused by excessive addition, it is preferably 5% by mass or less (e.g. 2% by mass or less, typically 1% by mass or less). When the silicon-containing cyclic compound content (amount added) is too excessive, disadvantages of the excessive addition outscore the effect to bring about greater cycle characteristics, whereby a desirable effect tends not to be produced.

The non-aqueous electrolyte may comprise optional additives as necessary to an extent not significantly impairing the objectives of the present invention. The additive may be used for one, two or more purposes, such as to increase the battery's output performance, to increase the shelf life (to inhibit a capacity decrease during storage, etc.), to bring about greater cycle characteristics, to increase the initial charging and discharging efficiencies, and so on. Examples of preferable additives include a fluorophosphate (preferably a difluorophosphate, e.g. lithium difluorophosphate represented by $LiPO_2F_2$) and lithium bis(oxalato)borate (Li-BOB). Alternatively, for instance, can be used additives such as cyclohexylbenzene, biphenyl and the like which are applicable in dealing with overcharges.

A production method for a lithium secondary battery is described next. The secondary battery production method comprises obtaining a positive electrode comprising a lithium transition metal composite oxide as a positive electrode active material and a negative electrode, and supplying a silicon-containing cyclic compound at least to the negative electrode. Besides these steps, the production method may further comprise other steps such as fabricating the positive electrode, fabricating the negative electrode, constructing a lithium secondary battery with the positive electrode and the negative electrode, and so on. However, since these can be carried out by suitably employing specifications described above and methods that have been conventionally used, they are not described in particular.

The production method disclosed herein comprises obtaining a positive electrode comprising a lithium transition metal composite oxide as a positive electrode active material and a negative electrode. The positive electrode comprising the positive electrode active material and the negative electrode are as described above. Thus, their specifications are not repeated.

The production method disclosed herein comprises supplying a silicon-containing compound at least to the negative electrode. This allows the silicon-containing cyclic compound and/or a reaction product thereof to be present at or around the negative electrode, acting to inhibit degradation of cycle characteristics caused by a transition metal dissolved out from the positive electrode active material. As the silicon-containing cyclic compound, those described earlier can be preferably used. While the silicon-containing cyclic compound is supplied at least to the negative electrode, it may be supplied also to other battery components such as the positive electrode, etc. From the standpoint of efficiently obtaining the effect of bringing about greater cycle characteristics, it is particularly preferable to supply the silicon-containing cyclic compound to the negative electrode (in typical, locally to the negative electrode).

Preferable examples of the supply method may include obtaining a non-aqueous electrolyte solution comprising the silicon-containing cyclic compound, and supplying the non-aqueous electrolyte solution obtained to an electrode body comprising the positive electrode and the negative electrode. Typically, the silicon-containing cyclic compound is added to the non-aqueous electrolyte solution and supplied to an electrode (typically the negative electrode) through the non-aqueous electrolyte solution. By this, the silicon-containing cyclic compound is supplied to the electrode body (typically the negative electrode) from the non-aqueous electrolyte solution which possibly comes in contact with the electrode body, thereby preferably producing the effect by the silicon-containing cyclic compound to bring about greater cycle characteristics.

The silicon-containing cyclic compound content (amount added) in the non-aqueous electrolyte solution is not particularly limited. From the standpoint of obtaining a sufficient effect to bring about greater cycle characteristics, it is preferably 0.01% by mass or more (e.g. 0.1% by mass or more, typically 0.3% by mass or more). From the standpoint of suppressing degradation of battery properties (typically a resistance increase) caused by excessive addition, it is preferably 5% by mass or less (e.g. 2% by mass or less, typically 1% by mass or less). When the silicon-containing cyclic compound content (amount added) is excessive, disadvantages of the excessive addition outscore the effect to bring about greater cycle characteristics, whereby desirable effect tends not to be produced.

The method for supplying the silicon-containing cyclic compound is not limited to including it in the non-aqueous electrolyte as described above. For example, the method may apply the silicon-containing cyclic compound to the surfaces of the positive electrode and/or negative electrode (typically of the negative electrode). Preferable examples of such a method include a method where a liquid in which the silicon-containing cyclic compound dispersed or dissolved in water or an organic solvent is applied to the surface of an electrode (negative electrode) and allowed to dry as necessary. Alternatively, the silicon-containing cyclic compound can be included in a composition for forming electrode material layer (preferably negative electrode material layer). In this case, the amount of the silicon-containing cyclic compound used (added) is preferably 0.001 part by mass or more (e.g. 0.01 part by mass or more, typically 0.03 part by mass or more) relative to 100 parts by mass of the electrode material layer (typically the negative electrode material layer). From the standpoint of inhibiting degradation of battery properties due to excessive addition, it is preferably 5 parts by mass or less (e.g. 2 parts by mass or less, typically 1 part by mass or less).

A lithium secondary battery constructed in such a way may be a 4.2 V or higher class lithium secondary battery. That is, it may be a lithium secondary battery whose positive electrode active material has a redox potential (operating voltage) including a 4.2 V (vs L/Li$^+$) or higher range in the 0% SOC to 100% SOC range. Such a secondary battery can be considered as a lithium secondary battery whose positive electrode's potential reaches 4.2 V or higher at least in a partial range between 0% SOC and 100% SOC. The effect by this invention to bring about greater cycle characteristics can be preferably produced in high-voltage charging and discharging. Thus, it is preferable to construct the lithium secondary battery as a 4.3 V or higher class (e.g. a 4.35 V or higher class, or even a 4.5 V or higher class) lithium secondary battery, or even as a 4.6 V or higher class (e.g. 4.8 V or higher class, or even a 4.9 V or higher class) lithium secondary battery.

Figure 7:
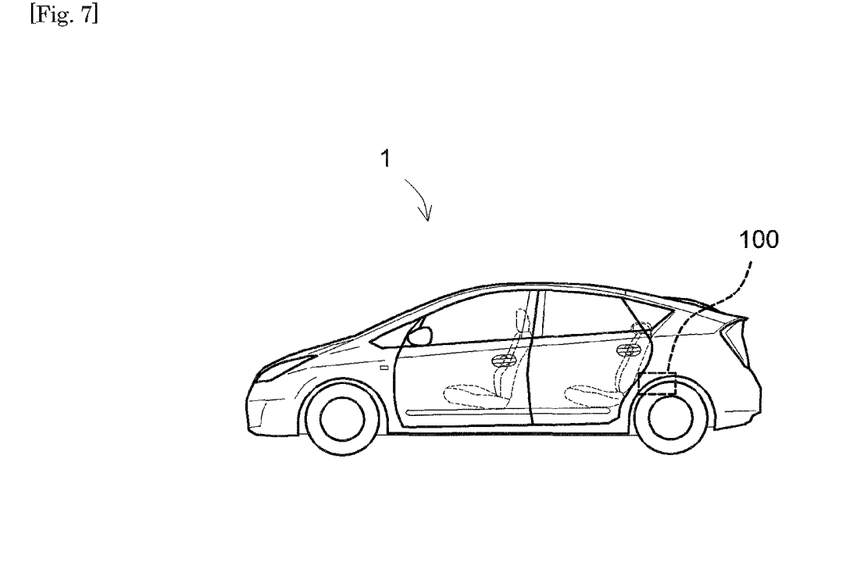
FIG. 7 shows a side view of a vehicle (automobile) comprising the lithium secondary battery according to an embodiment.

As described above, with increased cyclic properties in high-voltage charging and discharging, the 4.2 V or higher class lithium secondary battery in the art disclosed herein can be used as a secondary battery for various purposes. For example, as shown in FIG. 7, a lithium secondary battery 100 can be installed in a vehicle 1 such as an automobile, etc., and preferably used as a power supply for a drive source such as a motor and the like to drive the vehicle 1. Accordingly, the present invention can provide a vehicle (typically an automobile, particularly an automobile comprising an electric motor such as a hybrid vehicle (HV), plug-in hybrid vehicle (PHV), electric vehicle (EV) and fuel cell vehicle) 1 comprising, as its power source, the lithium secondary battery (typically a battery system comprising several series-connected batteries) 100.

Several worked examples relating to the present invention are described below, but the present invention is not intended to be limited to these examples. In the description below, "parts" and "%" are by mass unless otherwise specified.

Example 1

[Fabrication of Positive Electrode]

With N-methyl-2-pyrrolidone (NMP), were mixed LiNi$_{0.5}$Mn$_{1.5}$O$_4$ powder (Ni—Mn spinel) as a positive electrode active material, acetylene black (AB) as a conductive material and polyvinylidene fluoride (PVDF) as a binder at a mass ratio of these materials of 85:10:5 to prepare a paste-like positive electrode material layer-forming composition. The composition was evenly applied to one face of aluminum foil (15 μm thick) to a coating amount of 6.5 mg/cm$^2$ (based on non-volatiles). The coating was allowed to dry, pressed and cut out to a prescribed size (a circle of 14 mm diameter) to obtain a positive electrode.

[Fabrication of Negative Electrode]

With NMP, were mixed graphite powder as a negative electrode active material and PVDF as a binder at a mass ratio of these materials of 92.5:7.5 to prepare a paste-like negative electrode material layer-forming composition. The composition was evenly applied to one face of copper foil (15 μm thick) to a coating amount of 13 mg/cm$^2$ (based on non-volatiles). The coating was allowed to dry, pressed and cut out to a prescribed size (a circle of 16 mm diameter) to obtain a negative electrode.

[Fabrication of Lithium Secondary Battery]

Figure 4:
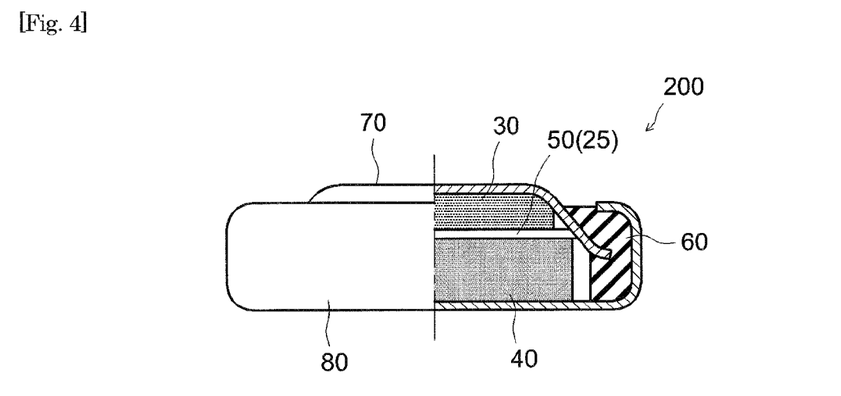
FIG. 4 shows a cross-sectional view illustrating a coin cell fabricated in a worked example.

Using the positive electrode and negative electrode fabricated as described above, was fabricated a 2032 type coin cell 200 having an approximate constitution illustrated in FIG. 4. In particular, the positive electrode 30 and negative electrode 40 fabricated above were layered along with a separator 50 impregnated with a non-aqueous electrolyte solution 25. The resultant was placed in a container 80 (negative terminal) and the same electrolyte solution was further added in drops. Subsequently, container 80 was sealed with a gasket 60 and a lid 70 (positive terminal) to obtain the battery 200. As the separator, was used a 25 μm thick polypropylene (PP) porous film cut out to a prescribed size (a circle of 19 mm diameter). As the non-aqueous electrolyte solution, was used an electrolyte solution containing approximately 1 mol/L of LiPF$_6$ as a supporting salt dissolved in a 3:4:3 (volume ratio) solvent mixture of ethylene carbonate (EC), ethyl methyl carbonate (EMC) and dimethyl carbonate (DMC) and further containing 0.5% 2,4,6,8-tetravinyl-2,4,6,8-tetramethylcyclotetrasiloxane (4VC4S) as a silicon-containing cyclic compound.

Examples 2 and 3

The silicon-containing cyclic compound contents (amounts added) were modified as shown in Table 1. Otherwise, in the same manner as Example 1, coin cells according to Examples 2 and 3 were fabricated.

Example 4

No 4VC4S was used. Otherwise, in the same manner as Example 1, a coin cell according to Example 4 was fabricated.

Examples 5 to 7

4VC4S was replaced with the additives shown in Table 1. Otherwise, in the same manner as Examples 1, coin cells according to 5 to 7 were fabricated.

Example 8

As the non-aqueous solvent for the non-aqueous electrolyte solution, a 1:1 (volume ratio) solvent mixture of difluoroethylene carbonate (DFEC) and diethyl carbonate (DEC) was used in place of the 3:4:3 (volume ratio) solvent mixture of EC/EMC/DMC. Otherwise, in the same manner as Examples 1, a coin cell according to Example 8 was fabricated.

Example 9

No 4VC4S was used. Otherwise, in the same manner as Examples 8, a coin cell according to Example 9 was fabricated.

[Capacity Retention Rate after 100 Cycles]

Figure 5:
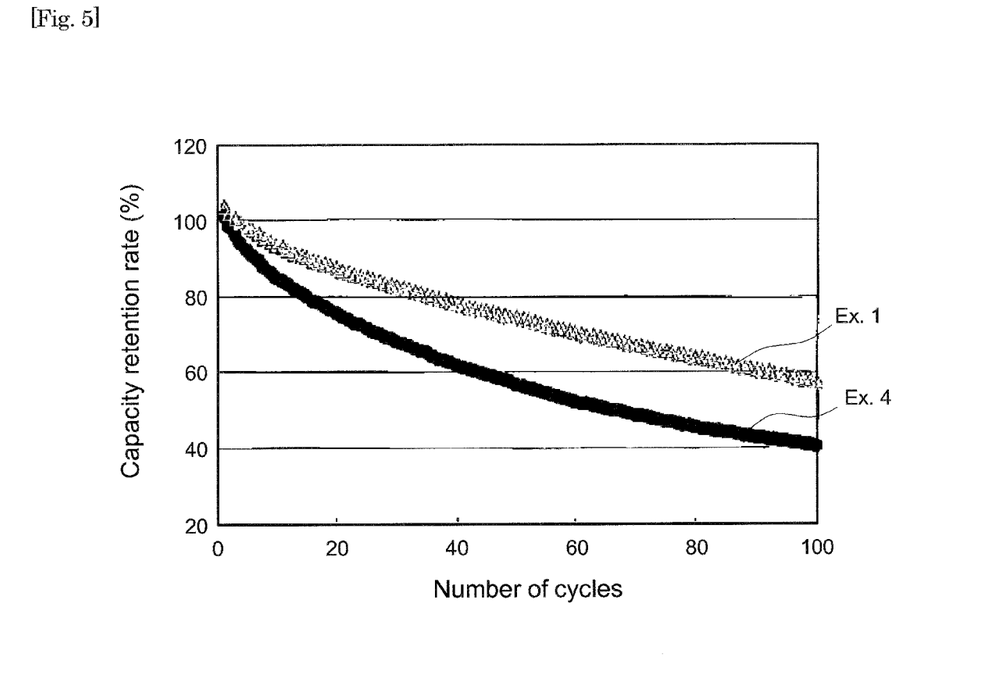
FIG. 5 shows a graph representing relationships between capacity retention rate vs. number of cycles in capacity retention rate measurement tests.

At a temperature of 25° C., each battery obtained above was subjected to 3 cycles of alternate charging at a 1/10 C rate to 4.1 V and discharging at the same rate to 3.0 V. Subsequently, in an environment at 60° C., it was subjected to 100 cycles of constant-current, constant-voltage (CCCV) charging (1 C rate, 0.15 C cut) to 4.9 V and constant-current (CC) discharging (1 C rate) to 3.5 V (cycle test). With the first cycle's discharge capacity (initial discharge capacity) being 100%, the retention rate (%) of discharge capacity after 100 cycles was determined. The results are shown in Table 1. With respect to Example 1 and Example 4, the relationships between capacity retention rate (%) vs. number of cycles are shown in FIG. 5.

[Table 1]

TABLE 1

| | Additive | Amount of additive added (%) | Non-aqueous solvent | Capacity retention rate after 100 cycles (%) |
|---|---|---|---|---|
| Ex. 1 | 4VC4S | 0.5 | EC/EMC/DMC | 55 |
| Ex. 2 | 4VC4S | 0.1 | EC/EMC/DMC | 43 |
| Ex. 3 | 4VC4S | 1 | EC/EMC/DMC | 42 |
| Ex. 4 | — | — | EC/EMC/DMC | 40 |
| Ex. 5 | Hexamethylcyclotrisiloxane | 0.5 | EC/EMC/DMC | 39 |
| Ex. 6 | Vinyltrimethylsilane | 0.5 | EC/EMC/DMC | 40 |
| Ex. 7 | Divinyldisiloxane | 0.5 | EC/EMC/DMC | 30 |
| Ex. 8 | 4VC4S | 0.5 | DFEC/DEC | 61 |
| Ex. 9 | — | — | DFEC/DEC | 49 |

Example 10

The silicon-containing cyclic compound was changed from 4VC4S to 2,4,6-trivinyl-2,4,6-trimethylcyclotrisiloxane (3VC3S). Otherwise, in the same manner as Example 1, a coin cell according to Example 10 was fabricated.

The respective batteries according to Example 1, Example 4 and Example 10 were subjected to the same test as the test for capacity retention rate after 100 cycles. The results are shown in Table 2.

[Table 2]

TABLE 2

| | Additive | Amount of additive added (%) | Capacity retention rate after 100 cycles (%) |
|---|---|---|---|
| Ex. 1 | 4VC4S | 0.5 | 52 |
| Ex. 10 | 3VC3S | 0.5 | 50 |
| Ex. 4 | — | — | 41 |

Example 11

As the positive electrode active material, $LiMn_2O_4$ powder (Mn spinel) was used in place of the Ni—Mn spinel type. Otherwise, in the same manner as Example 1, a coin cell according to Example 11 was fabricated.

Example 12

No 4VC4S was used. Otherwise, in the same manner as Example 11, a coin cell according to Example 12 was fabricated.

[Capacity Retention Rate after 50 Cycles]

At a temperature of 25° C., the batteries according to Example 11 and Example 12 were each subjected to 3 cycles of alternate charging at a 1/10 C rate to 4.1 V and discharging at the same rate to 3.0 V. Subsequently, in an environment at 60° C., each battery was subjected to 50 cycles of CCCV charging (1 C rate, 0.15 C cut) to 4.9 V and CC discharging (1 C rate) to 3.0 V (cycle test). With the first cycle's discharge capacity (initial discharge capacity) being 100%, the retention rate (%) of discharge capacity after 50 cycles was determined. The results are shown in Table 3.

[Capacity Retention Rate after 100 Cycles]

Figure 6:
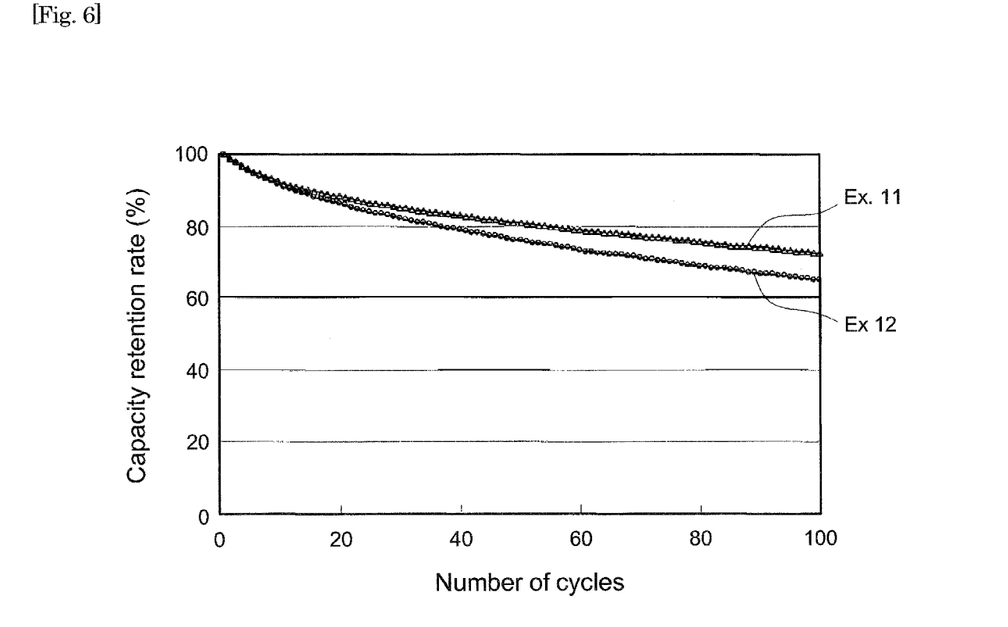
FIG. 6 shows a graph representing relationships between capacity retention rate vs. number of cycles in capacity retention rate measurement tests.

At a temperature of 25° C., the batteries according to Example 11 and Example 12 were each subjected to 3 cycles of alternate charging at a 1/10 C rate to 4.1 V and discharging at the same rate to 3.0 V Subsequently, in an environment at 60° C., each battery was subjected to 100 cycles of CCCV charging (1 C rate, 0.15 C cut) to 4.2 V and CC discharging (1 C rate) to 3.0 V (cycle test). With the first cycle's discharge capacity (initial discharge capacity) being 100%, the retention rate (%) of discharge capacity after 100 cycles was determined. The results are shown in Table 3. The relationships between capacity retention rate (%) vs. number of cycles are shown in FIG. 6.

[Table 3]

TABLE 3

| | Positive electrode active material | Additive Species | Amount added (%) | Capacity retention rate (%) After 100 cycles 4.2 V | After 50 cycles 4.9 V |
|---|---|---|---|---|---|
| Ex. 11 | Mn spinel | 4VC4S | 0.5 | 72 | 41 |
| Ex. 12 | Mn spinel | — | — | 65 | 35 |

Example 13

As the positive electrode active material, $LiMnPO_4$ powder (Mn olivine) was used in place of the Ni—Mn spinel type. Otherwise, in the same manner as Example 1, a positive electrode was fabricated and a coin cell according to Example 13 was fabricated.

Example 14

No 4VC4S was used. Otherwise, in the same manner as Example 13, a coin cell according to Example 14 was fabricated.

[Capacity Retention Rate after 100 Cycles]

At a temperature of 25° C., the batteries according to Example 13 and Example 14 were each subjected to 3 cycles of alternate charging at a 1/10 C rate to 4.1 V and discharging at the same rate to 3.0 V. Subsequently, in an environment at 60° C., it was subjected to 100 cycles of CCCV charging (1 C rate, 0.15 C cut) to 4.8 V and CC discharging (1 C rate) to 2.0 V (cycle test). With the first cycle's discharge capacity (initial discharge capacity) being 100%, the retention rate (%) of discharge capacity after 100 cycles was determined. The results are shown in Table 4.

[Table 4]

TABLE 4

| | Positive electrode active material | Additive Species | Amount added (%) | Capacity retention rate after 100 cycles (%) |
|---|---|---|---|---|
| Ex. 13 | Mn olivine | 4VC4S | 0.5 | 45 |
| Ex. 14 | Mn olivine | — | — | 20 |

Example 15

As the positive electrode active material, LiNi$_{1/3}$Co$_{1/3}$Mn$_{1/3}$O$_2$ powder (NiCoMn layered) was used in place of the Ni—Mn spinel type. Otherwise, in the same manner as Example 1, a positive electrode was fabricated and a coin cell according to Example 15 was fabricated.

Example 16

No 4VC4S was used. Otherwise, in the same manner as Example 15, a coin cell according to Example 16 was fabricated.

[Capacity Retention Rate after 100 Cycles]

At a temperature of 25° C., the batteries according to Example 15 and Example 16 were each subjected to 3 cycles of alternate charging at a 1/10 C rate to 4.1 V and discharging at the same rate to 3.0 V Subsequently, in an environment at 60° C., each battery was subjected to 100 cycles of CCCV charging (1 C rate, 0.15 C cut) to 4.6 V and CC discharging (1 C rate) to 3.0 V (cycle test). With the first cycle's discharge capacity (initial discharge capacity) being 100%, the retention rate (%) of discharge capacity after 100 cycles was determined. The results are shown in Table 5.

[Table 5]

TABLE 5

| | Positive electrode active material | Additive Species | Amount added (%) | Capacity retention rate after 100 cycles (%) |
|---|---|---|---|---|
| Ex. 15 | NiCoMn layered | 4VC4S | 0.5 | 30 |
| Ex. 16 | NiCoMn layered | — | — | 13 |

Example 17

The silicon-containing cyclic compound was changed from 4VC4S to 2,2,4,4,6,6,8,8-octavinylcyclotetrasiloxane (8VC4S). Otherwise, in the same manner as Example 1, a coin cell according to Example 17 was fabricated.

[Capacity Retention Rate after 100 Cycles]

At a temperature of 25° C., the battery according to Example 17 was subjected to 3 cycles of alternate charging at a 1/10 C rate to 4.1 V and discharging at the same rate to 3.0 V (conditioning). Subsequently, in an environment at 60° C., it was subjected to 100 cycles of CCCV charging (1 C rate, 0.15 C cut) to 4.9 V and CC discharging (1 C rate) to 3.5 V (cycle test). With the first cycle's discharge capacity (initial discharge capacity) being 100%, the retention rate (%) of discharge capacity after 100 cycles was determined. The results are shown in Table 1. For comparison, the same test was carried out for the batteries according to Examples 1 and 4. The results are shown in Table 6.

[AC Impedance Measurement]

Figure 8:
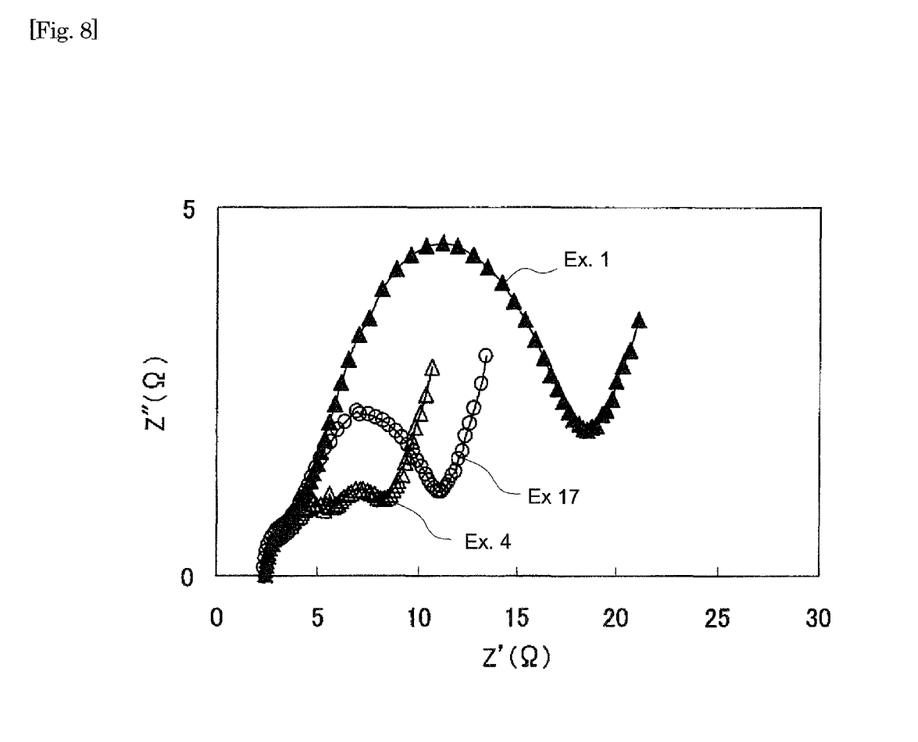
FIG. 8 shows the Cole-Cole plot of pre-cycle AC impedance (in the plot, Z' denotes the real part while Z" denotes the imaginary part).

The battery according to Example 17 adjusted to 60% SOC after the conditioning (prior to cycle test) was subjected to an AC (alternating current) impedance measurement. For comparison, the same test was carried out for the batteries according to Examples 1 and 4. The results are shown in FIG. 8. The AC impedance was measured over a frequency range of 1 MHz to 0.1 Hz with a voltage amplitude of 5 mV.

[Table 6]

TABLE 6

| | Additive | Amount of additive added (%) | Capacity retention rate after 100 cycles (%) |
|---|---|---|---|
| Ex. 17 | 8VC4S | 0.5 | 67 |
| Ex. 1 | 4VC4S | 0.5 | 66 |
| Ex. 4 | — | — | 58 |

As shown in Tables 1, 2 and FIG. 5, with respect to the batteries according to Example 1 to Example 3 using as an additive a cyclic siloxane having a vinyl group, their capacity retention rates after 100 cycles were higher than those of the batteries according to Example 4 to Example 7 not using a cyclic siloxane having a vinyl group. With respect to Example 5 to Example 7, despite of the use of siloxanes satisfying only one condition between having a vinyl group and having a cyclic structure as additives, they showed cycle characteristics as low as or lower than Example 4 using no additives. Although not quite as good as Example 1, greater cycle characteristics were observed in the battery according to Example 10 using as the additive a vinyl group-containing cyclic siloxane different from the one used in Example 1. From these results, it is evident that the use of a silicon-containing compound that has a cyclic structure and has a vinyl group can bring about greater cycle characteristics in the 4.2 V or higher class. The battery of Example 8 which used a non-aqueous electrolyte solution comprising a fluorinated carbonate as the non-aqueous solvent exhibited greater cycle characteristics than the other examples using fluorine-free carbonates. In a battery that charges and discharges at a high voltage, it is desirable that the non-aqueous electrolyte solution comprises a fluorinated carbonate.

As shown in Tables 3 to 5 and FIG. 6, it is evident that regardless of the type (structure) of positive electrode active material, the use of a silicon-containing compound that has a cyclic structure and has a vinyl group can bring about greater cycle characteristics in the 4.2 V or higher class.

As shown in Table 6 and FIG. 8, with respect to the battery according to Example 17 using a silicon-containing compound having a high vinyl group substituent ratio (typically a cyclic siloxane in which all substituents on its silicon atoms are vinyl groups), while the capacity retention rate after 100 cycles was as good as Example 1, the initial resistance was lower than the battery according to Example 1. From these results, the use of a silicon-containing compound having a high vinyl group substituent ratio can be found to be capable of bringing about great cycle characteristics while lowering the initial resistance.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST 1 automobile (vehicle)
10 battery case
12 opening
14 lid
20 wound electrode body
25 non-aqueous electrolyte (non-aqueous electrolyte solution)
30 positive electrode (positive electrode sheet)
32 positive current collector
34 positive electrode material layer
35 positive current collector-overlapping portion
36 positive electrode material layer-free portion
37 inner positive terminal
38 outer positive terminal
40 negative electrode (negative electrode sheet)
42 negative current collector
44 negative electrode material layer
45 negative current collector-overlapping portion
46 negative electrode material layer-free portion
47 inner negative terminal
48 outer negative terminal
50, 50A, 50B separators (separator sheets)
100 lithium secondary battery

The invention claimed is:

1. A method for producing a 4.2 V or higher class lithium secondary battery, the method comprising:
    obtaining a positive electrode and a negative electrode, the positive electrode comprising a lithium transition metal composite oxide as a positive electrode active material;
    obtaining a non-aqueous electrolyte comprising a silicon-containing cyclic compound; and
    supplying the non-aqueous electrolyte obtained to an electrode body comprising the positive electrode and the negative electrode,
    wherein the silicon-containing cyclic compound comprises at least one silicon atom in its ring and has at least one vinyl group, and
    the silicon-containing cyclic compound is a vinyl group-containing cyclic siloxane represented by a formula (1):

(1)

wherein $R^1$ and $R^2$ are either the same or different with each being an organic group having 1 to 12 carbon atoms, at least either $R^1$ or $R^2$ includes a vinyl group, and n is an integer between 3 and 10.

2. The method according to claim 1, wherein, in the silicon-containing cyclic compound, all substituents bonded to the silicon atom(s) constituting the ring are vinyl groups.

3. The method according to claim 1, wherein the positive electrode active material is a spinel lithium transition metal composite oxide comprising Li and further Ni and Mn as transition metals.

4. The method according to claim 1, wherein the non-aqueous electrolyte comprises a fluorinated carbonate as a non-aqueous solvent in the non-aqueous electrolyte.

5. A 4.2 V or higher class lithium secondary battery comprising:
    a positive electrode comprising a lithium transition metal composite oxide as a positive electrode active material;
    a negative electrode; and
    a non-aqueous electrolyte including a silicon-containing cyclic compound, wherein the silicone-containing cyclic compound comprises at least one silicon atom in its ring and has at least one vinyl group, and
    the silicon-containing cyclic compound is a vinyl group-containing cyclic siloxane represented by a formula (1):

(1)

wherein $R^1$ and $R^2$ are either the same or different with each being an organic group having 1 to 12 carbon atoms, at least either $R^1$ or $R^2$ includes a vinyl group, and n is an integer between 3 and 10.

6. The lithium secondary battery according to claim 5, wherein, in the silicon-containing cyclic compound, all substituents bonded to the silicon atom(s) constituting the ring are vinyl groups.

7. The lithium secondary battery according to claim 5, wherein the positive electrode active material is a spinel lithium transition metal composite oxide comprising Li and further Ni and Mn as transition metals.

8. The lithium secondary battery according to claim 5, wherein the non-aqueous electrolyte comprises a fluorinated carbonate as a non-aqueous solvent.

9. The lithium secondary battery according to claim 5, wherein the negative electrode comprises a negative electrode active material layer including a negative electrode active material, and the negative electrode active material is carbon particles.

10. The lithium secondary battery according to claim 5, wherein the negative electrode comprises a negative electrode active material layer including carbon particles as negative electrode active material, and
    the content of the carbon particles in the negative electrode active material layer is 90% by mass or greater.

11. A vehicle equipped with the lithium secondary battery according to claim 5.

* * * * *